(12) United States Patent
Shinano et al.

(10) Patent No.: US 10,365,542 B2
(45) Date of Patent: Jul. 30, 2019

(54) LENS BARREL AND CAMERA PROVIDED WITH SAME

(71) Applicant: Panasonic Intellectual Property Management Co., Ltd., Osaka (JP)

(72) Inventors: Fumio Shinano, Osaka (JP); Tetsuya Morita, Osaka (JP); Hideaki Kawane, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/996,570

(22) Filed: Jun. 4, 2018

(65) Prior Publication Data

US 2018/0275491 A1 Sep. 27, 2018

Related U.S. Application Data

(63) Continuation of application No. PCT/JP2016/005233, filed on Dec. 27, 2016.

(30) Foreign Application Priority Data

Dec. 28, 2015 (JP) ................................ 2015-256594

(51) Int. Cl.
*G03B 17/14* (2006.01)
*G02B 7/02* (2006.01)
(Continued)

(52) U.S. Cl.
CPC ............. *G03B 17/14* (2013.01); *G02B 7/021* (2013.01); *G02B 7/14* (2013.01); *G03B 17/561* (2013.01); *G03B 17/565* (2013.01)

(58) Field of Classification Search
None
See application file for complete search history.

(56) References Cited

U.S. PATENT DOCUMENTS 5,327,292 A * 7/1994 Eguchi ................. F16M 11/041
                                                                359/811
6,035,134 A * 3/2000 Sato ..................... G02B 27/646
                                                                348/208.11
(Continued)

FOREIGN PATENT DOCUMENTS

| JP | 9-222541 | 8/1997 |
| JP | 10-083025 | 3/1998 |

(Continued)

OTHER PUBLICATIONS

International Search Report of PCT application No. PCT/JP2016/005233 dated Apr. 4, 2017.

*Primary Examiner* — Clayton E. LaBalle
*Assistant Examiner* — Dennis Hancock
(74) *Attorney, Agent, or Firm* — Wenderoth, Lind & Ponack, L.L.P.

(57) ABSTRACT

A lens barrel is detachably attached to a camera body, and includes an exterior unit, a rear frame, a tripod mount, and a tripod lock screw. The exterior unit includes an optical system. The rear frame is mounted to the exterior unit so as to be rotatable around an optical axis. An outer peripheral surface of the lens barrel is configured with the exterior unit and the rear frame. The tripod mount is provided on the rear frame to be fixed to a tripod. The tripod lock screw fixes a rotational position around the optical axis of the rear frame to the camera body at a predetermined rotational position, in a state in which the lens barrel is mounted to the camera body.

10 Claims, 19 Drawing Sheets

(51) Int. Cl.
 *G02B 7/14* (2006.01)
 *G03B 17/56* (2006.01)

(56) References Cited

U.S. PATENT DOCUMENTS

| | | | | | |
|---|---|---|---|---|---|
| 2003/0218809 | A1* | 11/2003 | Yamazaki | ................. | G02B 7/02 |
| | | | | | 359/819 |
| 2005/0237635 | A1* | 10/2005 | Sugita | .................... | F16M 11/16 |
| | | | | | 359/818 |
| 2009/0185297 | A1* | 7/2009 | Sugita | .................. | G03B 17/561 |
| | | | | | 359/819 |
| 2013/0022347 | A1* | 1/2013 | Imura | .................... | G03B 17/14 |
| | | | | | 396/530 |

FOREIGN PATENT DOCUMENTS

| | | |
|---|---|---|
| JP | 2001-350078 | 12/2001 |
| JP | 2012-037693 | 2/2012 |
| JP | 2012-047898 | 3/2012 |
| JP | 2013-045034 | 3/2013 |

* cited by examiner

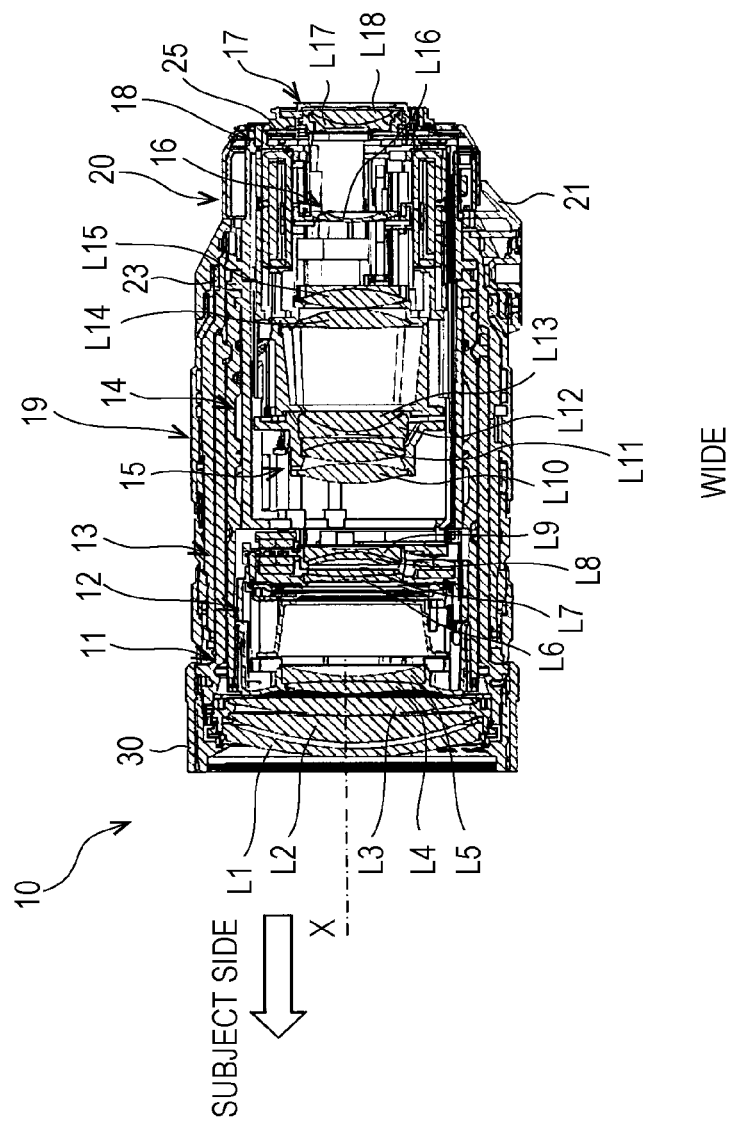

NORMAL ORIENTATION

90° ROTATION

NORMAL ORIENTATION

90° ROTATION

LENS BARREL AND CAMERA PROVIDED WITH SAME

BACKGROUND

1. Technical Field

The present disclosure relates to a lens barrel and a camera provided with the same.

2. Description of the Related Art

A lens barrel having a long focal distance is larger in size and heavier in weight than a general lens barrel. Accordingly, when a lens barrel having a long focal distance is attached to a camera body, a gravity center position of a camera is moved to a subject side. As a result, when a tripod is connected to a camera body side, the camera may fall to the subject side due to the movement of the gravity center position of the camera to the subject side.

Therefore, a lens barrel provided with a tripod mount is used, so that a camera attached with a lens barrel having a long focal distance is supported by a tripod in a balanced manner.

PTL 1 discloses a lens barrel in which a tripod mount is mounted to an exterior ring via a tripod ring.

CITATION LIST

Patent Literature

PTL 1: Unexamined Japanese Patent Publication No. 2012-37693

SUMMARY

In a lens barrel having a ring-type rotational tripod mount, it is difficult to miniaturize the lens barrel and to reduce a number of components.

A lens barrel according to the present disclosure is a lens barrel detachably attached to a camera body. The lens barrel includes a front frame, a rear frame, a tripod mount, and a fixing member. The front frame includes an optical system. The rear frame is mounted to the front frame so as to be rotatable around an optical axis. An outer peripheral surface of the lens barrel is configured with the front frame and the rear frame. The tripod mount is provided on the rear frame to be fixed to a tripod. The fixing member that fixes the rear frame to the camera body at a predetermined rotational position to rotate around the optical axis, when the rear frame is attached to the camera body.

The lens barrel according to the present disclosure can attain miniaturization of the lens barrel and reduction of a number of components.

BRIEF DESCRIPTION OF THE DRAWINGS

FIG. 2A is a sectional view of the lens barrel in FIG. 1A;

DETAILED DESCRIPTION

Exemplary embodiments will be described in detail below with reference to the drawings as appropriate. However, descriptions in more detail than necessary may be omitted. For example, a detailed description of a matter which is already well-known, or an overlapped description for a substantially identical configuration may be omitted. This is to avoid unnecessary redundancy of the following description and facilitate the understanding of one skilled in the art.

The applicant provides the attached drawings and the following description such that one skilled in the art can sufficiently understand the present disclosure, and therefore, they do not intend to restrict the subject matters of claims.

In a conventional lens barrel, it is necessary to separately prepare a member (a tripod ring) for providing a tripod mount to mount a tripod that supports the lens barrel.

Accordingly, a number of components that constitute the lens barrel may be increased, and the lens barrel may be enlarged.

First Exemplary Embodiment

A lens barrel according to an exemplary embodiment of the present disclosure is described below with reference to FIGS. 1A to 15B.

(Overall Configuration of Lens Barrel 10)

Figure 11:
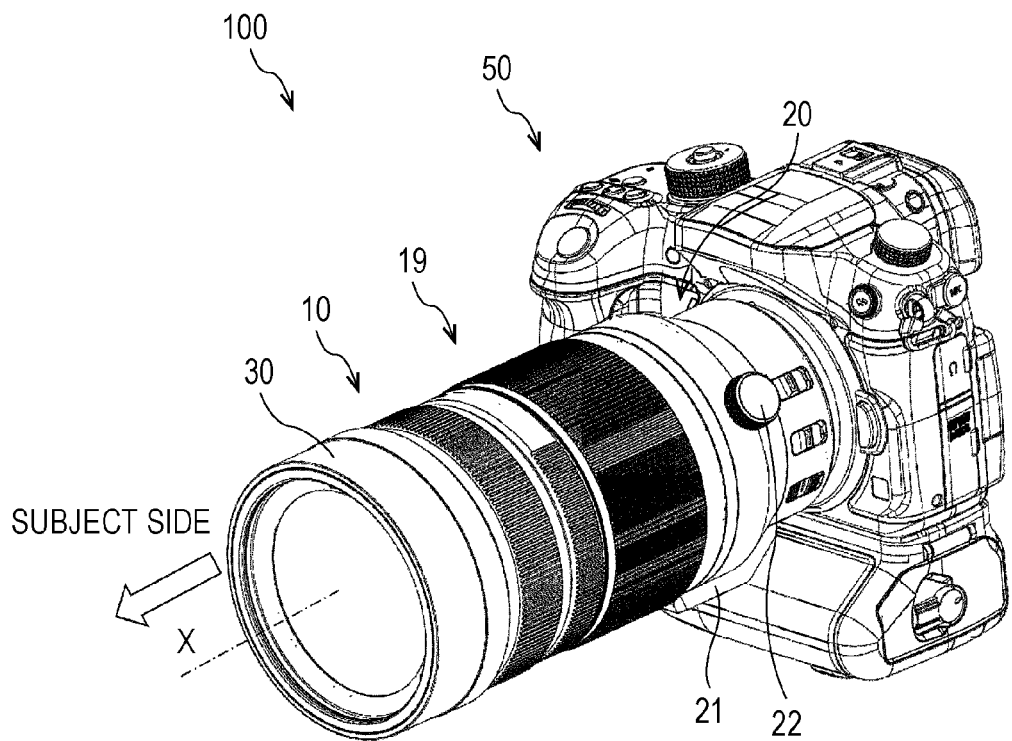
FIG. 11 is a perspective view illustrating the state in which the tripod mount is in the normal orientation in a state in which the lens barrel in FIG. 1A is attached to a camera body.
Figure 12:
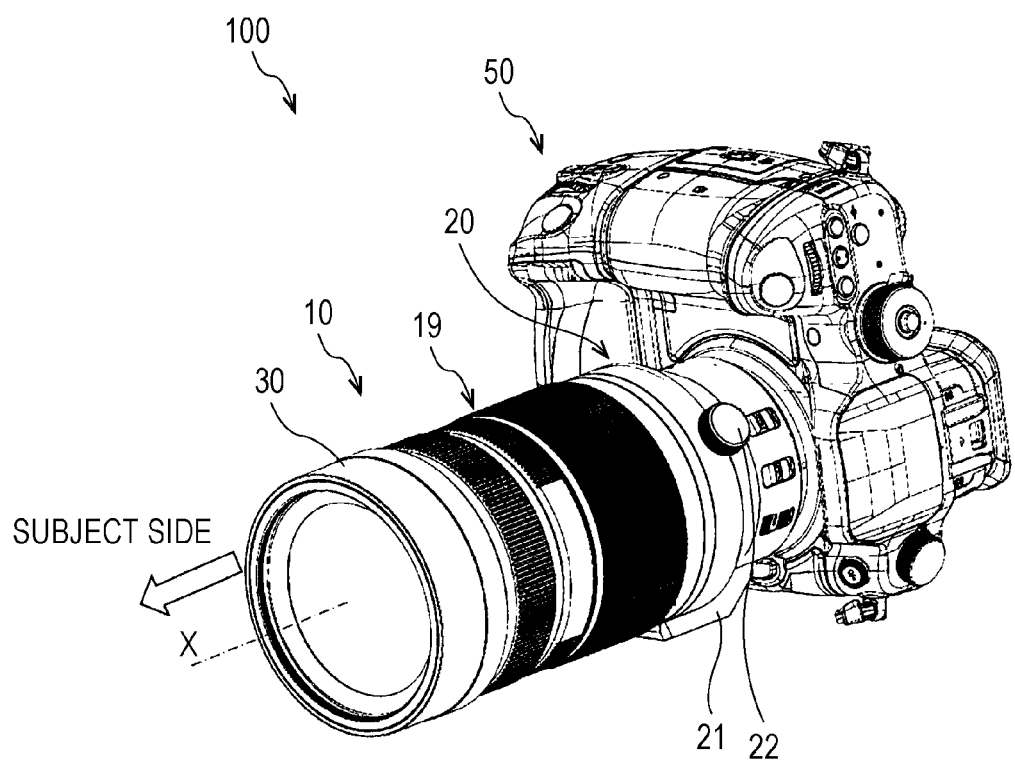
FIG. 12 is a perspective view illustrating the state in which the tripod mount is rotated by 90 degrees from the normal orientation in the state in which the lens barrel in FIG. 1A is attached to the camera body.

Lens barrel 10 according to the present exemplary embodiment is a lens barrel attached to a mount part of camera body 50 (see FIGS. 11 and 12).

Camera 100 includes lens barrel 10 and camera body 50. Lens barrel 10 has an optical system (lenses L1 to L18 (see FIG. 2A etc.)) that guides a subject image to an imaging element provided in camera body 50.

Figure 1A:
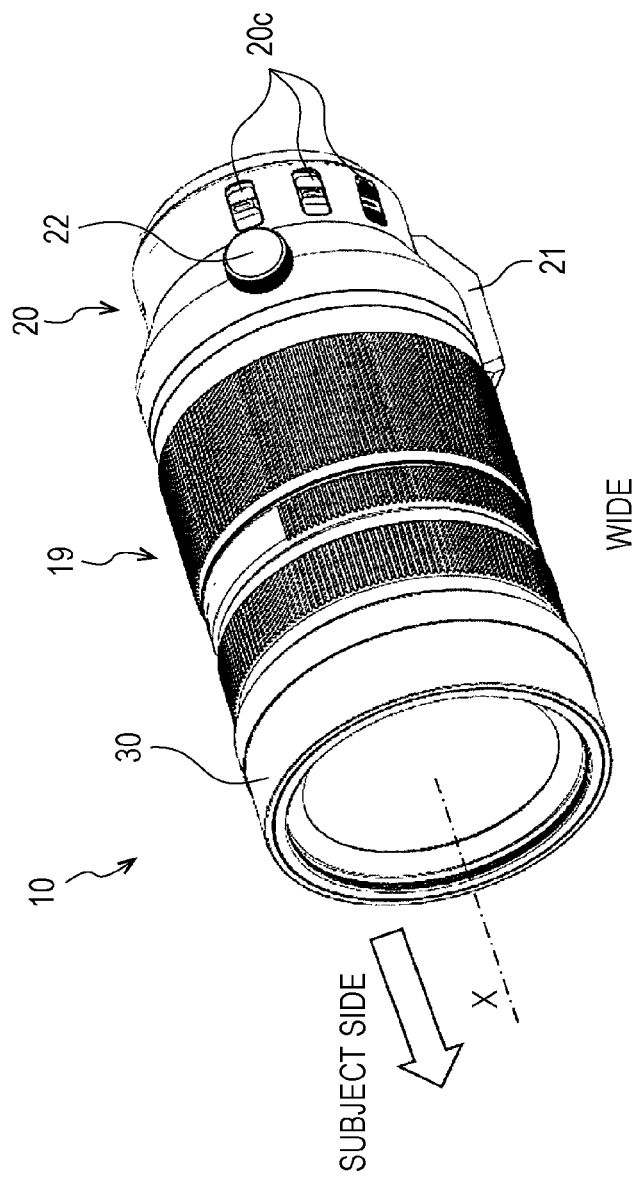
FIG. 1A is a perspective view illustrating a state in which an optical system of a lens barrel including a holding structure of a lens hood according to an exemplary embodiment of the present disclosure is located on a wide-angle side (a WIDE position)

Further, as illustrated in FIG. 1A etc., lens hood 30 is mounted, at a tip part on a subject side of lens barrel 10, so as to be extendable to the subject side. Furthermore, as illustrated in FIGS. 1A and 1B, since the built-in optical system moves between a wide-angle side (a WIDE position) and a telephoto side (a TELE position) in lens barrel 10, photographing can be performed by changing a magnification.

In a state in which lens barrel 10 is at the WIDE position illustrated in FIG. 1A, first group unit 11 is stored in an inner peripheral surface side of exterior unit 19, as illustrated in FIG. 2A.

Figure 1B:
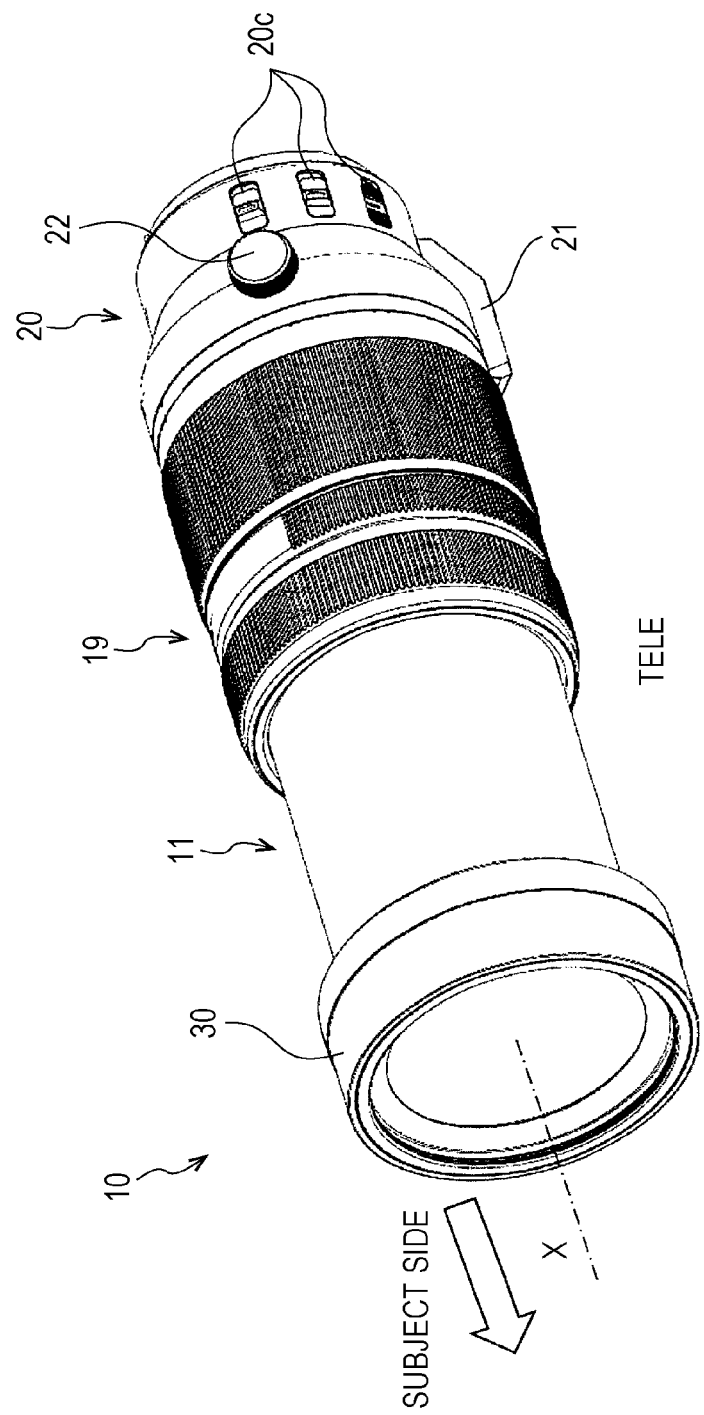
FIG. 1B is a perspective view illustrating a state in which the optical system of the lens barrel in FIG. 1A is moved to a telephoto side (a TELE position)
Figure 2B:
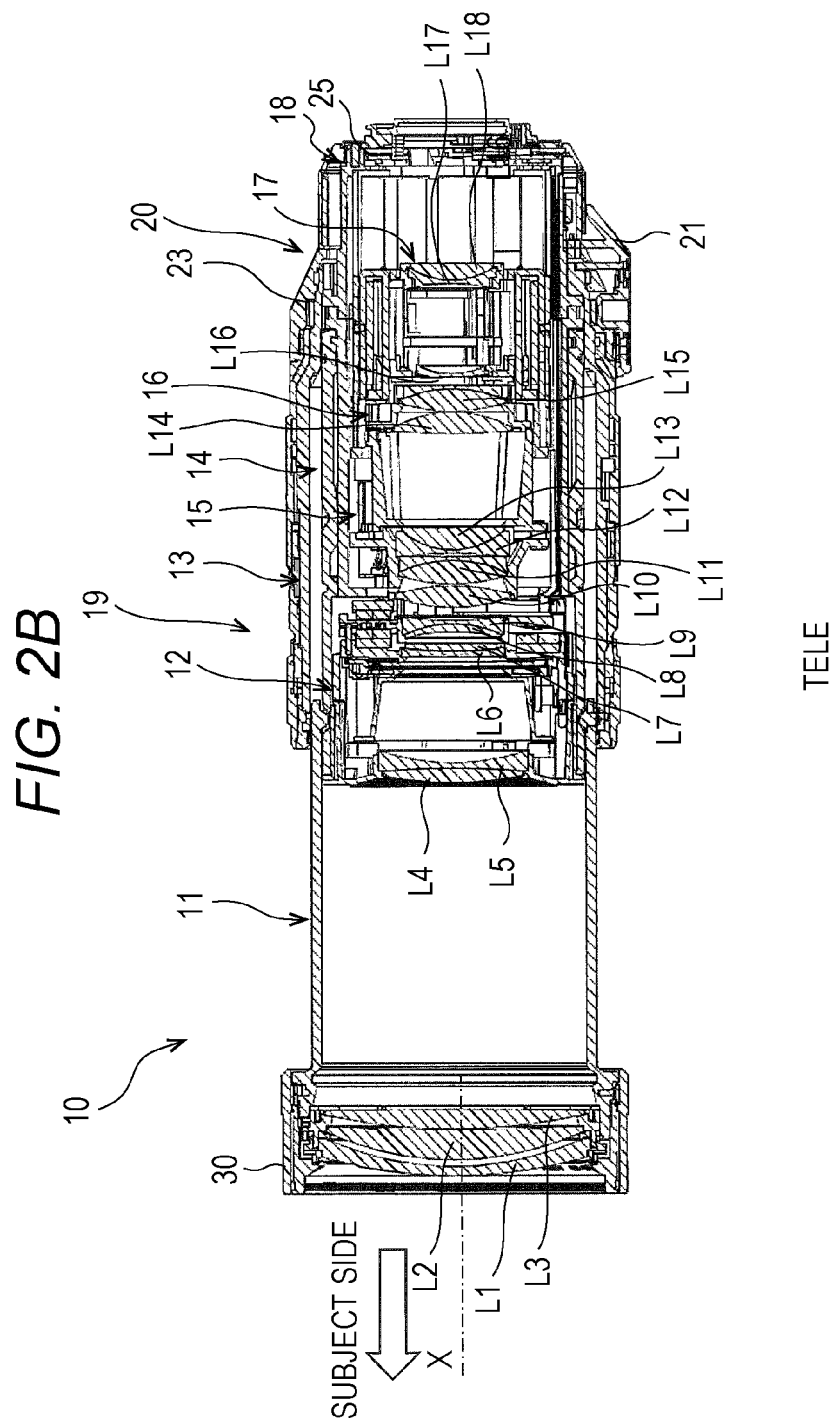
FIG. 2B is a sectional view of the lens barrel in FIG. 1B.

Meanwhile, in a state in which lens barrel 10 is at the TELE position illustrated in FIG. 1B, first group unit 11 advances to the subject side along optical axis X and protrudes from exterior unit 19 toward the subject, as illustrated in FIG. 2B.

Figure 3:
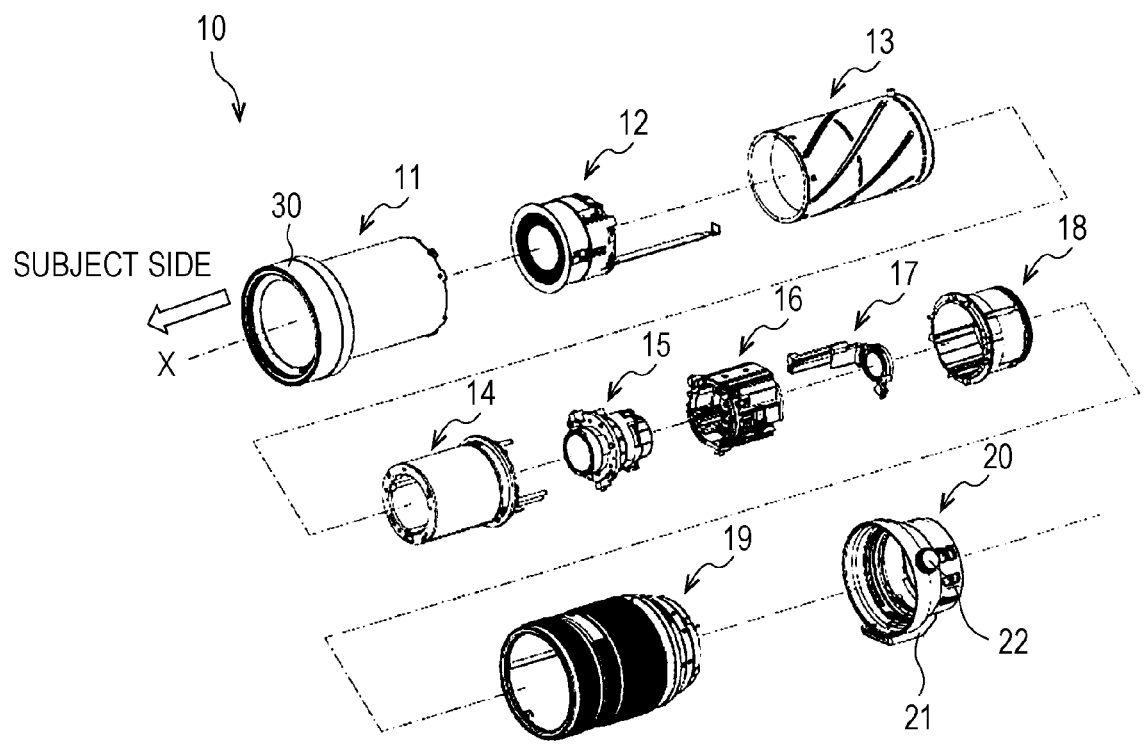
FIG. 3 is an exploded perspective view of components that constitute the lens barrel in FIG. 1A.

Moreover, as illustrated in FIG. 3, lens barrel 10 includes first group unit 11, second group unit 12, cam frame 13, fixed frame 14, third group unit 15, fourth group unit 16, fifth group unit 17, mount base 18, exterior unit (front frame) 19, rear frame 20, and the optical system having a plurality of lenses L1 to L18.

As illustrated in FIG. 3, first group unit 11 is a cylindrical member disposed closest to the subject side in lens barrel 10. As illustrated in FIGS. 2A, 2B, and the like, first group unit 11 advances or retreats along optical axis X in a state of holding lenses L1 to L3 on the subject side. With this configuration, the magnification of the optical system can be changed by changing a distance between lenses L1 to L18. In other words, wide-angle photography, telephotography, or the like can be performed.

Further, first group unit 11 in the present exemplary embodiment has lens hood 30 provided at the tip part on the subject side to suppress incidence of unnecessary light during photographing.

As illustrated in FIG. 3, lens hood 30 is a cylindrical member. When lens hood 30 is used, lens hood 30 is mounted so as to be extendable to the subject side along optical axis X.

As illustrated in FIGS. 2A, 2B, and the like, second group unit 12 is a cylindrical member disposed on an inner peripheral surface side of first group unit 11 to hold lenses L4 to L9.

As illustrated in FIG. 3, cam frame 13 is a cylindrical member, and is disposed on an outer peripheral surface side of fourth group unit 16. Moreover, cam frame 13 is formed with a cam groove to be fitted with a cam pin (not illustrated) provided on an outer peripheral surface of fourth group unit 16. Cam frame 13 is engaged with a zoom ring to be rotationally operated by a user. Cam frame 13 is rotationally driven in association with the rotation of the zoom ring.

When cam frame 13 rotates, the cam pin moves along the cam groove. With this configuration, positions of first group unit 11 to fifth group unit 17 in optical axis X direction can be adjusted by rotating cam frame 13. Hence, wide-angle photography, telephotography, or the like can be performed by adjusting distances between lenses L1 to L18 included in first group unit 11 to fifth group unit 17.

As illustrated in FIG. 3, fixed frame 14 is a cylindrical member disposed on outer peripheral sides of second group unit 12 and fourth group unit 16, which each have a cylindrical shape. Fixed frame 14 is disposed so as to cover outer peripheral surfaces of second group unit 12 to fourth group unit 16.

As illustrated in FIG. 3, third group unit 15 is disposed on an inner peripheral side of fourth group unit 16 having a cylindrical shape in a movable manner along optical axis X. As illustrated in FIGS. 2A, 2B, third group unit 15 holds lenses L10 to L15. Moreover, third group unit 15 moves along optical axis X in association with the rotation of cam frame 13.

Fourth group unit 16 is substantially cylindrical, and fourth group unit 16 holds lens L16. As illustrated in FIG. 3, fourth group unit 16 is disposed downstream of third group unit 15, as viewed from the subject side in optical axis X direction. Fourth group unit 16 moves along optical axis X in association with the rotation of cam frame 13. An autofocus actuator moves lens L16 of fourth group unit 16 relatively to cam frame 13 along optical axis X.

As illustrated in FIG. 3, fifth group unit 17 is disposed on the inner peripheral side of fourth group unit 16 having a cylindrical shape in a movable manner in optical axis X direction. As illustrated in FIGS. 2A, 2B, fifth group unit 17 holds lenses L17, L18. Moreover, fifth group unit 17 moves along optical axis X in association with the rotation of cam frame 13.

As illustrated in FIG. 3, mount base 18 is a substantially cylindrical member serving as a base for lens barrel 10. Cam frame 13 is mounted to mount base 18 in a relatively rotatable manner. Fourth group unit 16 is held on inner peripheries of cam frame 13 and fixed frame 14.

Figure 4:
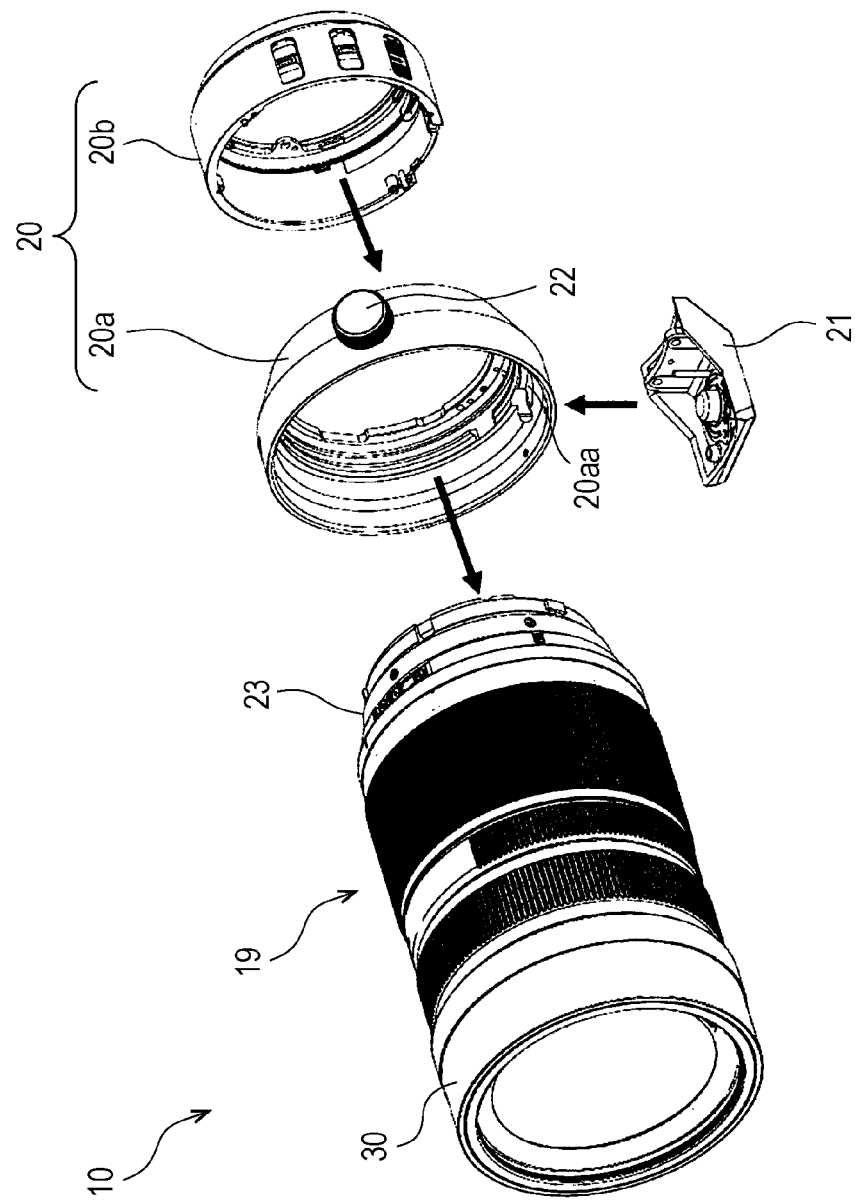
FIG. 4 is an exploded perspective view of a rear frame that constitutes an exterior part disposed farther than the lens barrel from a subject in FIG. 1A.

As illustrated in FIGS. 1A, 4, and the like, exterior unit (front frame) 19 is a cylindrical member that constitutes an exterior part (an outer peripheral surface) of lens barrel 10. An annular focus ring, zoom ring, or the like is mounted to an outer peripheral surface of exterior unit 19 in a rotatable manner.

Rear frame 20 is mounted to a farther-end of exterior unit 19 from the subject. Both rear frame 20 and exterior unit 19 constitute the exterior part of lens barrel 10. Moreover, rear frame 20 is mounted to mount base 18 and exterior unit 19 in a relatively rotatable manner.

Further, rear frame 20 has switch member 20c operated by a user on an outer peripheral surface. Rear frame 20 includes circuit board 25 (see FIG. 2B etc.) and switch flexible part (flexible board) 24 (see FIG. 5 etc.). Circuit board 25 detects operation of switch member 20c by a user. Switch flexible part 24 is electrically connected to circuit board 25. Furthermore, as illustrated in FIG. 4, rear frame 20 has tripod base ring 20a and switch unit frame 20b.

Figure 5:
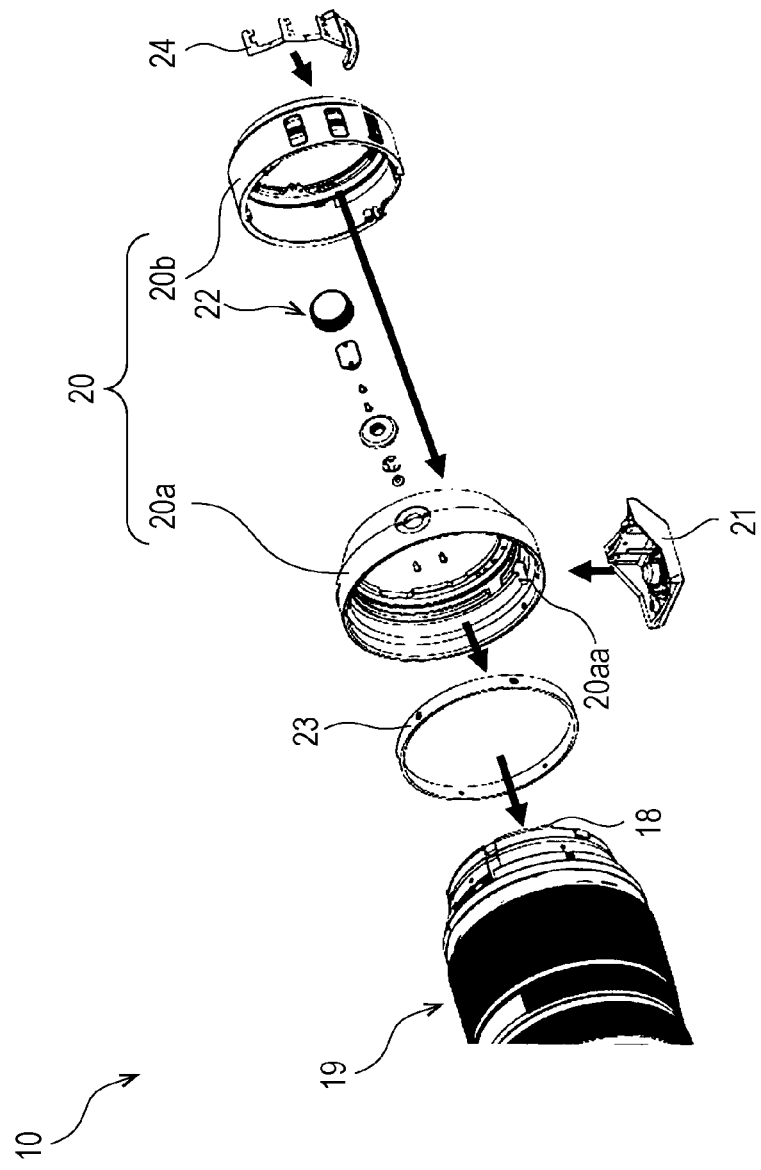
FIG. 5 is a more detailed exploded perspective view of the rear frame in FIG. 4.

As illustrated in FIG. 4, tripod mount 21 for connecting a tripod is mounted to an outer peripheral part of tripod base ring 20a. Further, as illustrated in FIG. 5, tripod base ring 20a is mounted to a farther-end of mount base 18 from the subject, via tripod reinforcing ring 23.

As illustrated in FIG. 4, mounting part 20aa is an opening part formed so as to penetrate from an outer peripheral surface to an inner peripheral surface side of tripod base ring 20a. Tripod mount 21 is mounted to mounting part 20aa.

As illustrated in FIG. 4, switch unit frame 20b is a cylindrical member mounted to a farther-end of tripod base ring 20a from the subject. Note that, as illustrated in FIG. 5, switch unit frame 20b is fixed to tripod base ring 20a by using a plurality of screws (not illustrated). Moreover, various switches (switch member 20c) including a switch that switches between auto focus (AF) and manual focus (MF) are provided on an outer peripheral surface of switch unit frame 20b.

Figure 6:
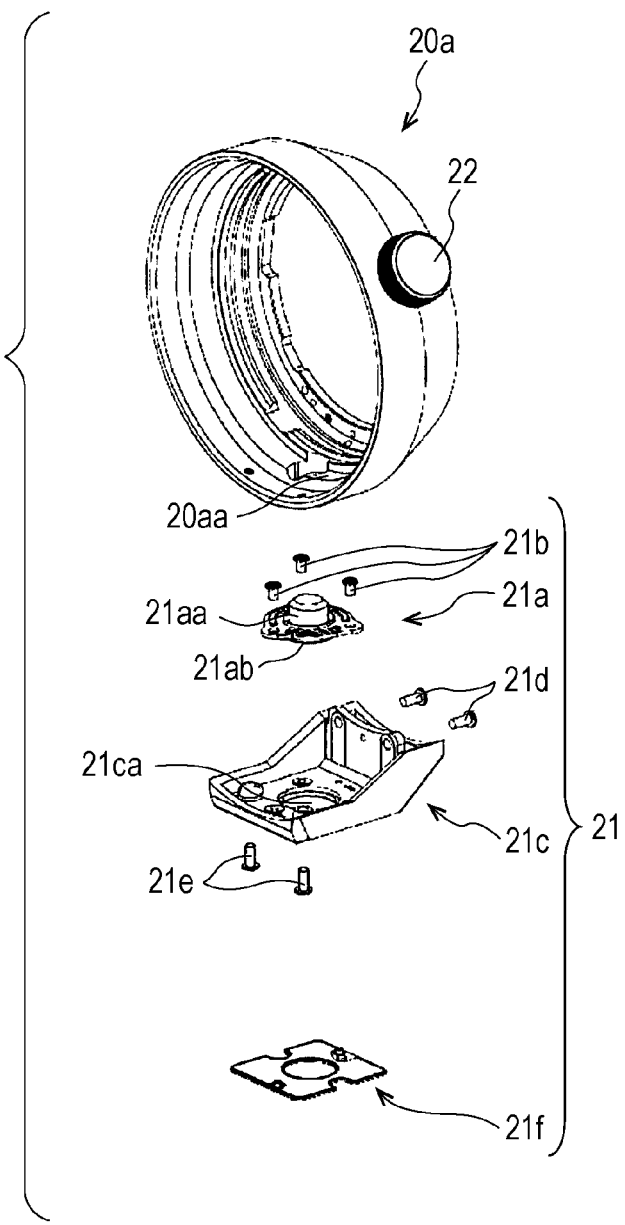
FIG. 6 is an exploded perspective view illustrating a configuration of a tripod mount mounted to the rear frame in FIG. 4.

Tripod mount 21 is a pedestal to which a tripod (not illustrated) is connected. Tripod mount 21 is mounted on the outer peripheral surface of tripod base ring 20a that constitutes the exterior part of lens barrel 10. Moreover, as illustrated in FIG. 6, tripod mount 21 has tripod screw 21a, screws 21b, tripod base 21c, screws 21d, screws 21e, and cover 21f.

Tripod screw 21a is a member made of metal into which a male screw part on a tripod side is screwed. With this configuration, the tripod is fixed to tripod mount 21. As illustrated in FIG. 6, tripod screw 21a has column part 21aa and screw part 2 1ab.

Column part 21aa is mounted to the opening part (mounting part 20aa) formed in tripod base ring 20a in an inserted manner.

Screw part 21ab is a female screw part into which the male screw part on the tripod side is screwed. As illustrated in FIG. 6, screw part 21ab is formed on a surface on a side opposite to column part 21aa in tripod screw 21a.

As illustrated in FIG. 6, screws 21b are used to fix tripod screw 21a to tripod base 21c.

As illustrated in FIG. 6, tripod base 21c is mounted to tripod base ring 20a. Tripod base 21c is fixed to the outer peripheral surface of tripod base ring 20a at four places by using screws 21d and screws 21e. Tripod screw 21a is mounted to tripod base 21c. With this configuration, tripod base ring 20a is fixed to tripod screw 21a. In other words, tripod base ring 20a is fixed to the tripod in a state in which the tripod is mounted to tripod screw 21a.

As illustrated in FIG. 6, cover 21f is a plate-shaped member made of resin that constitutes a surface on a side to which the tripod is connected (a lower side in FIG. 6) in tripod base 21c. Cover 21f is formed with screw holes into which screws 21e are inserted. Note that the plate-shaped member may be made of metal.

Figure 7:
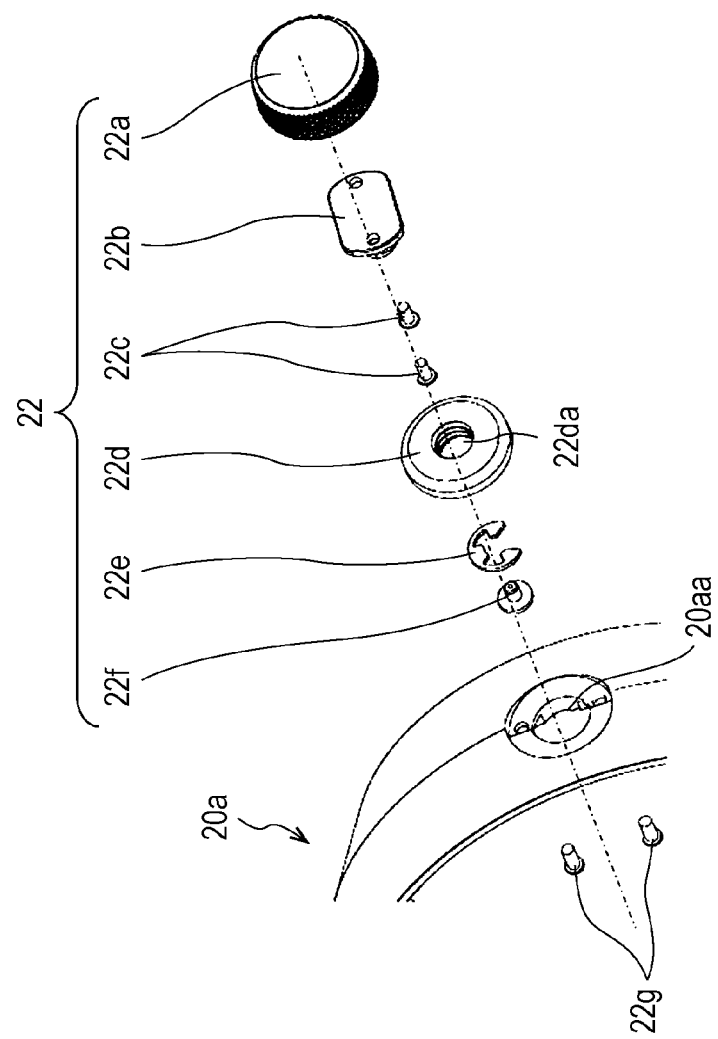
FIG. 7 is an exploded perspective view illustrating a configuration of a tripod lock screw mounted to the rear frame in FIG. 4.
Figure 8:
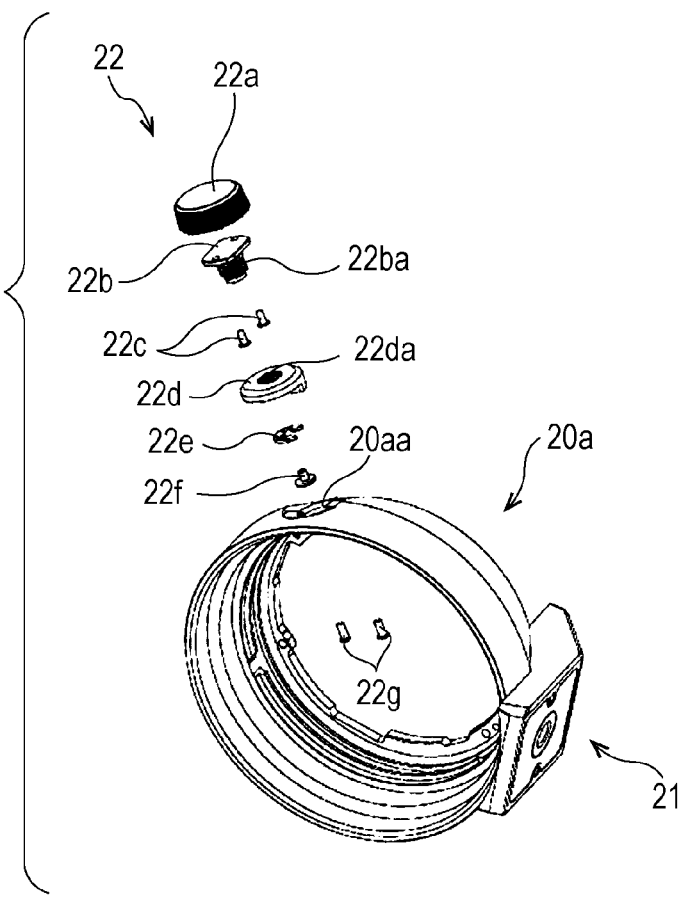
FIG. 8 is an exploded perspective view illustrating a configuration of the tripod lock screw mounted to the rear frame in FIG. 4.

As illustrated in FIG. 6, and the like, tripod lock screw (fixing member) 22 is mounted on the outer peripheral surface of tripod base ring 20a. When tripod lock screw 22 is loosened, rear frame 20 is relatively rotatable to exterior unit 19 (front frame). When tripod lock screw 22 is fixed, tripod lock screw 22 regulates relative rotation of rear frame 20 and exterior unit 19. With this configuration, the relative rotation of rear frame 20 and exterior unit 19 can be fixed at an arbitrary rotational position. Specifically, as illustrated in FIGS. 7 and 8, tripod lock screw 22 has rotary knob 22a, lock screw 22b, screws 22c, screw base 22d, fixing tool 22e, holding pin 22f, and screws 22g. With this configuration, tripod lock screw 22 can apply pressing force in a direction crossing optical axis X and regulate relative rotation of rear frame 20 to exterior unit 19.

Rotary knob 22a is a rotary knob member that constitutes an exterior surface of tripod lock screw 22 and is rotationally operated by a user's finger.

As illustrated in FIG. 8, lock screw 22b has male screw part 22ba to be mounted to tripod base ring 20a. Moreover, as illustrated in FIGS. 7 and 8, lock screw 22b is fixed to a back surface side of rotary knob 22a by using two screws 22c.

As illustrated in FIGS. 7 and 8, screw base 22d has female screw part 22da into which male screw part 22ba of lock screw 22b is screwed. By screwing male screw part 22ba into female screw part 22da, screw base 22d and rotary knob 22a are mounted in a rotatable manner. Further, as illustrated in FIGS. 7 and 8, screw base 22d is fixed to the outer peripheral surface of tripod base ring 20a by using two screws 22g.

As illustrated in FIGS. 7 and 8, fixing tool 22e is disposed so as to be sandwiched between screw base 22d and mounting part 20aa. Fixing tool 22e regulates a rotation range of male screw part 22ba. With this configuration, fixing tool 22e prevents male screw part 22ba from coming out of female screw part 22da into which male screw part 22ba is screwed.

Holding pin 22f is fixed to a tip part of male screw part 22ba of lock screw 22b. When rotary knob 22a is rotationally operated, holding pin 22f moves in a radial direction. A fixed state of tripod lock screw 22 is a state in which holding pin 22f is moved in a pushing direction, that is, a state in which holding pin 22f is protruded from the opening of mounting part 20aa to the inner peripheral surface side (an inner side in the radial direction) of tripod base ring 20a. With this configuration, when tripod lock screw 22 is in the fixed state, holding pin 22f can apply pressing force to a member disposed on the inner peripheral surface side of tripod base ring 20a (tripod reinforcing ring 23).

Figure 9:
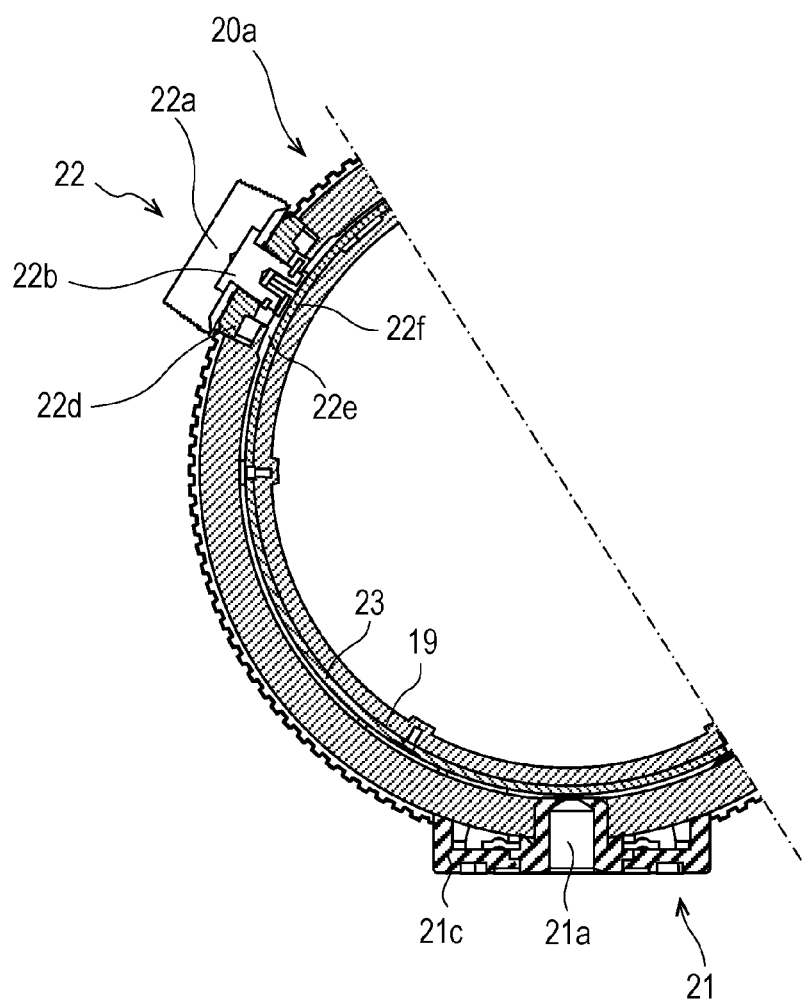
FIG. 9 is a sectional view illustrating a state in which the tripod mount of the lens barrel in FIG. 1A is in a normal orientation.
Figure 10:
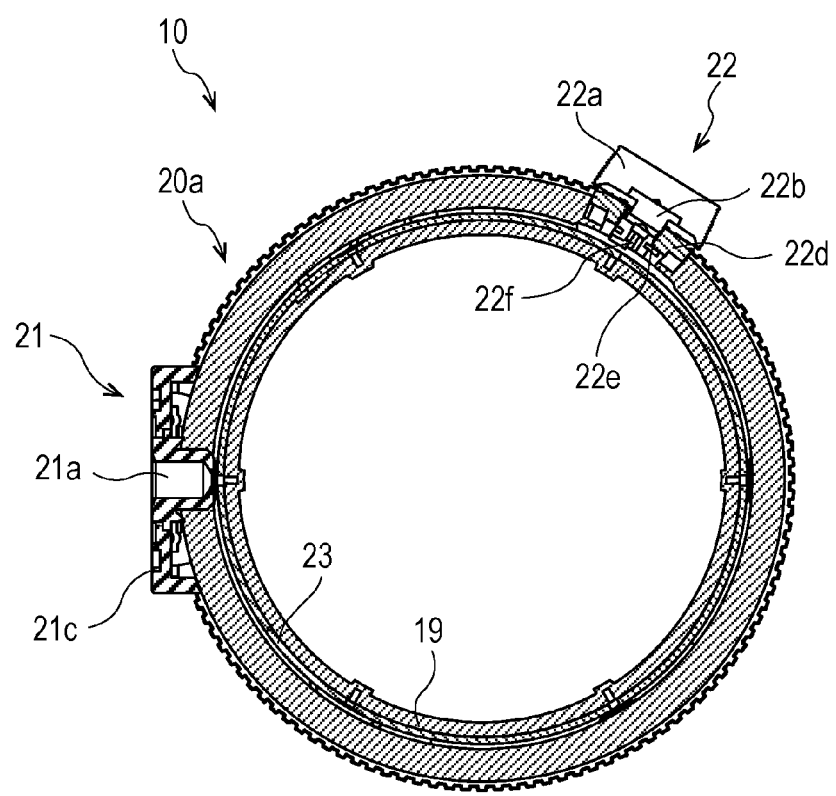
FIG. 10 is a sectional view illustrating a state in which the tripod mount of the lens barrel in FIG. 1A is rotated by 90 degrees from the normal orientation.

As illustrated in FIGS. 9 and 10, tripod reinforcing ring 23 is a ring-shaped member made of metal (an aluminum material (A5052), a stainless steel material (SUS), etc.) disposed on an inner peripheral side of holding pin 22f of tripod lock screw 22. When tripod lock screw 22 is rotationally operated and pushed into the inner peripheral side (the inner side in the radial direction) of tripod base ring 20a, holding pin 22f applies pressing force to an outer peripheral surface of tripod reinforcing ring 23. With this configuration, frictional force is generated between holding pin 22f and tripod reinforcing ring 23. Tripod reinforcing ring 23 is fixed to a member disposed on an inner peripheral side (a rear end of exterior unit 19) with a screw. With this configuration, rotation of exterior unit 19 to rear frame 20 can be regulated.

When the pressing force applied from holding pin 22f is applied to exterior unit 19 at this time, the rear end of exterior unit 19 may be deformed. Since tripod reinforcing ring 23 has higher rigidity than exterior unit 19, the pressing force applied from holding pin 22f can be dispersed. With this configuration, deformation of the rear end of exterior unit 19 caused by the pressing force applied from holding pin 22f can be prevented.

By regulating the rotation of exterior unit 19 to rear frame 20 as above, rotation of rear frame 20 to mount base 18 (camera body 50) can be regulated. As a result, a rotational position of camera body 50 to tripod mount 21 can be fixed at a desired rotational position. In other words, a photographing orientation of camera 100 can be changed, and the photographing orientation can be held, in a state in which lens barrel 10 is fixed to the tripod.

When photographing using a tripod is performed in a state in which camera body 50 is placed in a normal orientation to a subject, as illustrated in FIG. 11, tripod mount 21 and a bottom surface of camera body 50 are at the same rotational position. Accordingly, when photographing is performed in the normal orientation illustrated in FIG. 11, tripod lock screw 22 is rotated clockwise at the rotational position illustrated in FIG. 9 and fixed, thereby regulating rotation of rear frame 20.

With this configuration, relative rotational positions of tripod mount 21 and camera body 50 in the normal orientation can be held. In other words, photographing can be performed while preventing camera body 50 from rotating during the photographing.

Meanwhile, as illustrated in FIG. 12, when photographing using the tripod is performed in a state in which camera body 50 is rotated by 90 degrees to the subject, tripod mount 21 is fixed at a position rotated by 90 degrees to the bottom surface of camera body 50. When photographing is performed in a rotated orientation illustrated in FIG. 12 (an orientation rotated by 90 degrees), tripod lock screw 22 is rotated clockwise at a rotational position illustrated in FIG. 10 and fixed, thereby regulating rotation of rear frame 20.

With this configuration, relative rotational positions of tripod mount 21 and camera body 50 in the orientation rotated by 90 degrees can be held. In other words, photographing can be performed while preventing camera body 50 from rotating during the photographing.

Note that the bottom surface of camera body 50 is a surface on a side opposite to an upper part of camera body 50 to which a shutter or an electronic flash is attached in the normal orientation.

Switch flexible part (flexible board) 24 is a flexible board electrically connecting various switches of switch unit frame 20b and circuit board 25 (see FIG. 2A etc.) that constitute a farther-side of rear frame 20 from the subject. As illustrated in FIG. 5, switch flexible part 24 is disposed along an inner peripheral surface of switch unit frame 20b.

In lens barrel 10 of the present exemplary embodiment, as described above, rear frame 20 mounted with tripod mount 21 is rotatable to mount base 18. At this time, circuit board 25, to which one terminal of switch flexible part 24 is connected, is fixed to a member on a side of mount base 18. Meanwhile, the various switches, to which another terminal of switch flexible part 24 is connected, rotate together with switch unit frame 20b.

Accordingly, in the normal orientation illustrated in FIG. 11 and the orientation rotated by 90 degrees illustrated in FIG. 12, switch flexible part 24 is disposed on an inner peripheral surface side of switch unit frame 20b in a bent manner.

Figure 13A:
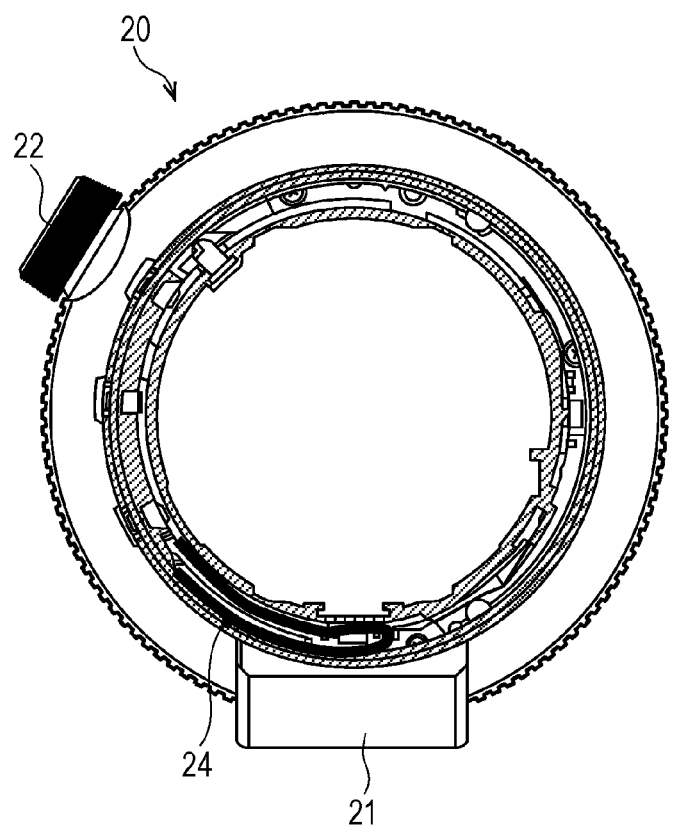
FIG. 13A is a view illustrating a switch flexible part when the tripod mount is in the normal orientation in the state in which the lens barrel in FIG. 1A is attached to the camera body.

Specifically, when camera 100 is in the normal orientation illustrated in FIG. 11, switch flexible part 24 is bent at a substantially center in a longitudinal direction along the inner peripheral surface of switch unit frame 20b, as illustrated in FIG. 13A.

Figure 13B:
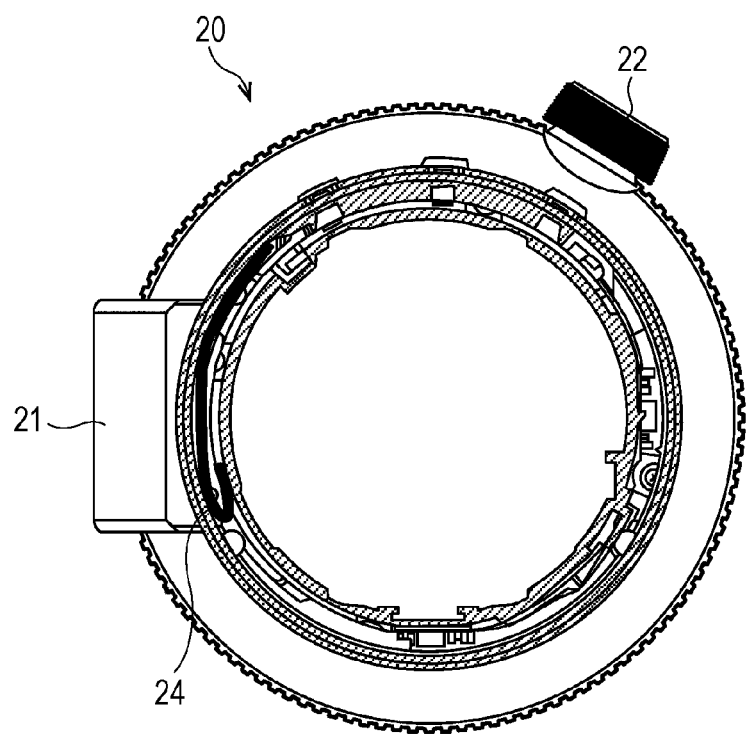
FIG. 13B is a view illustrating the switch flexible part when the tripod mount is rotated by 90 degrees from the normal orientation in the state in which the lens barrel in FIG. 1A is attached to the camera body.

Meanwhile, when camera 100 is in the orientation rotated by 90 degrees illustrated in FIG. 12, switch flexible part 24 is bent near one end in the longitudinal direction along the inner peripheral surface of switch unit frame 20b, as illustrated in FIG. 13B.

With this configuration, even when an orientation of camera 100 is changed in a state in which the tripod is connected, a bending degree of switch flexible part 24 is changed following rotation of rear frame 20 mounted with tripod mount 21. As a result, even when rear frame 20 is rotated, electrical connection between various switches of switch unit frame 20b and circuit board 25 can be secured.

With this configuration, while switch member 20c is provided on rear frame 20, exterior unit (front frame) 19 can be relatively rotated to rear frame 20. By providing switch member 20c on rear frame 20, even when a photographing orientation of camera body 50 is rotated, position of switch member 20c to the tripod is not changed. With this configuration, operation positions of the various switches can be fixed when camera body 50 is in the normal orientation and in the orientation rotated by 90 degrees.

Next, description is given of a configuration that can facilitate positioning in a state in which the photographing position of camera 100 is in the normal orientation as illustrated in FIG. 11 and in a state in which camera 100 is rotated by 90 degrees as illustrated in FIG. 12.

Figure 14:
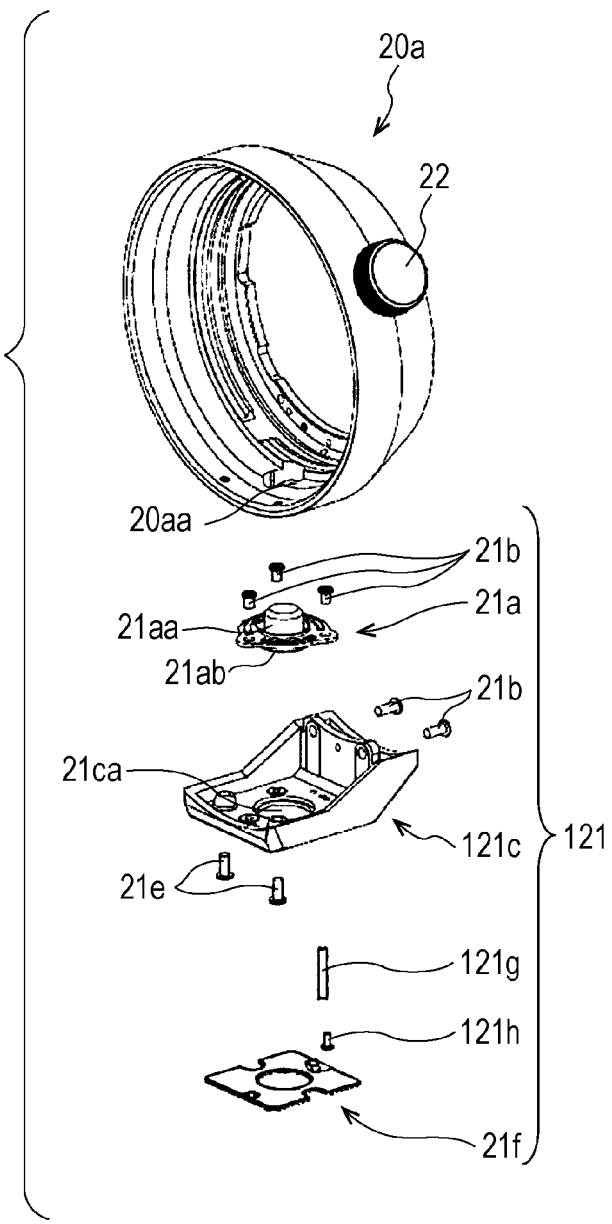
FIG. 14 is an exploded perspective view illustrating a configuration of a tripod mount mounted to a rear frame included in a lens barrel according to another exemplary embodiment of the present disclosure.
Figure 15A:
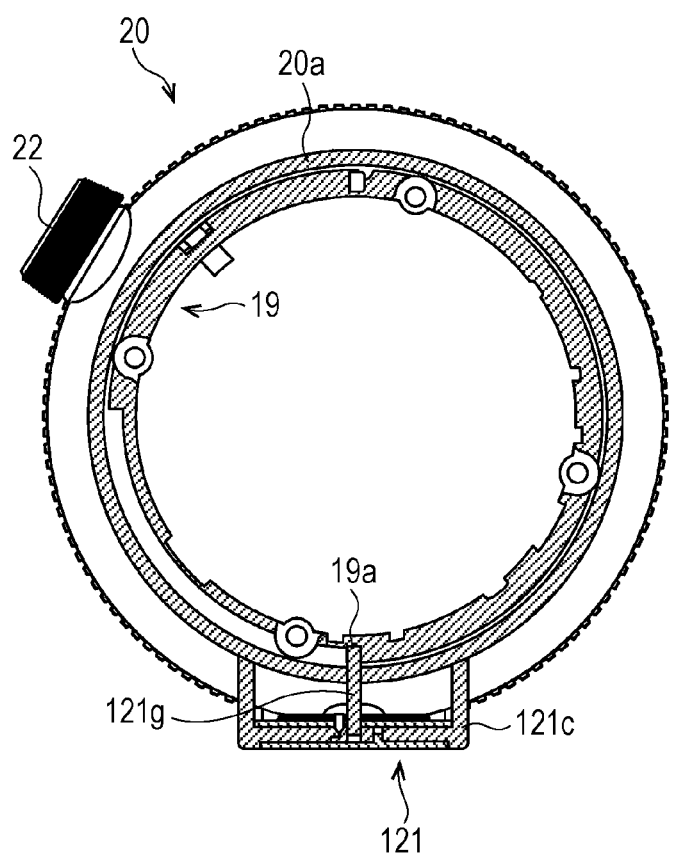
FIG. 15A is a sectional view illustrating a state in which the tripod mount is in a normal orientation in a state in which the lens barrel in FIG. 14 is attached to a camera body.
Figure 15B:
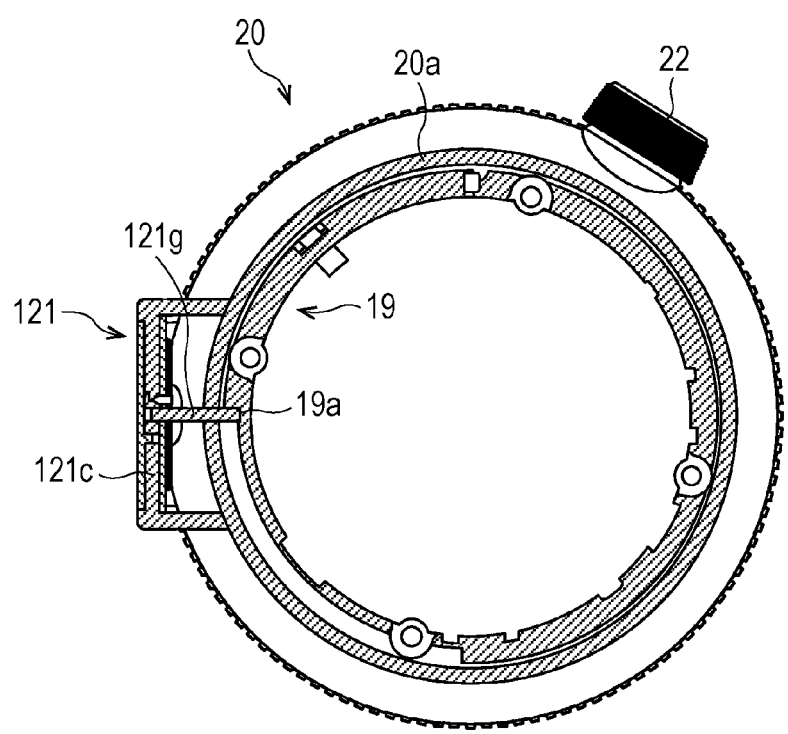
FIG. 15B is a sectional view illustrating a state in which the tripod mount is rotated by 90 degrees from the normal orientation in the state in which the lens barrel in FIG. 14 is attached to the camera body.

In this configuration, as illustrated in FIG. 14, locking pin 121g and fixing screw 121h are provided in tripod mount 121. Locking pin 121g is inserted into a through-hole that penetrates tripod base 121c. Fixing screw 121h advances and retreats locking pin 121g along a radial of the rear frame. As illustrated in FIGS. 15A and 15B, abutting part 19a serving as a step is formed at two places in exterior unit 19. Herein, the two steps are formed at positions where a central angle is 90 degrees on a circumference. When tripod mount 121 moves along with rotation of rear frame 20, locking pin 121g abuts on abutting part 19a at a predetermined position. Accordingly, a rotation range of rear frame 20 is regulated. In each end of the rotation range of rear frame 20, locking pin 121g of tripod mount 121 abuts on abutting part 19a of exterior unit 19. By rotating tripod lock screw 22 in this state to regulate the rotation of rear frame 20, exterior unit 19 and rear frame 20 can be fixed at predetermined rotational positions. With such a configuration, locking pin 121g and abutting part 19a can easily fix rear frame 20 at rotational positions in the normal orientation and the orientation rotated by 90 degrees.

Other Exemplary Embodiments

One exemplary embodiment of the present disclosure has been described above, but the present disclosure is not limited thereto, and various modifications may be made without departing from the scope of the present disclosure.

(A)

As illustrated in FIG. 4, the above-described exemplary embodiment has been described by way of an example in which rear frame 20 mounted with tripod mount 21 is divided into tripod base ring 20a and switch unit frame 20b. However, the present disclosure is not limited to this example.

For example, a tripod mount may be provided on a rear frame which is indivisible and in which tripod base ring 20a and switch unit frame 20b are integrated with each other.

(B)

As illustrated in FIG. 4 etc., the above-described exemplary embodiment has been described by way of an example in which tripod mount 21 is mounted to rear frame 20 that constitutes a part of the exterior part of lens barrel 10. However, the present disclosure is not limited to this example.

For example, if a rotating member is mounted so as to be rotatable to a mount base mounted to a camera body, a lens barrel in which a tripod mount is mounted to another exterior part may be used.

(C)

As illustrated in FIG. 6, the above-described exemplary embodiment has been described by way of an example in which tripod mount 21 is mounted to the outer peripheral surface of rear frame 20 (tripod base ring 20a) by using the plurality of screws 21d, 21e. However, the present disclosure is not limited to this example.

For example, a lens barrel in which a tripod mount is integrally molded with a rear frame may be used.

(D)

The above-described exemplary embodiment has been described by way of an example in which tripod lock screw 22 is rotationally operated to regulate rotation of rear frame 20, in a state in which camera 100 is in the normal orientation (FIG. 11) and in the orientation rotated by 90 degrees (FIG. 12). However, the present disclosure is not limited to this example.

For example, when photographing is performed in a state in which a camera fixed to a tripod is inclined by 45 degrees to a subject, a tripod lock screw may be rotationally operated so as to regulate rotation of a rear frame in an orientation at a desired rotation angle.

In other words, the tripod lock screw may be rotationally operated in the other camera orientation, without being limited to the normal orientation and the orientation rotated by 90 degrees, to regulate rotation of the rear frame.

(E)

The above-described exemplary embodiment has been described by way of an example in which, when rotation of rear frame 20 is regulated in the desired orientation to fix rear frame 20, tripod lock screw 22 is rotationally operated to apply pressing force to the inner peripheral side (the inner side in the radial direction). However, the present disclosure is not limited to this example.

For example, a fixing member, such as a tripod lock screw, is not limited to a rotationally operated member, and a pushing member may be used.

In this case, in order to regulate rotation of rear frame 20 in a desired orientation and fix rear frame 20, pressing force can be applied to the inner peripheral side by pushing the fixing member at a desired rotational position. As a result, an effect similar to the effect of the above-described exemplary embodiment can be obtained.

Meanwhile, rotation of the rear frame can be regulated by frictional force according to a configuration that applies pressing force. With this configuration, a rotational position of the rear frame can be prevented from becoming unstable caused by vibration etc. applied to camera 100.

A lens barrel of the present disclosure does not require a ring-type rotational tripod mount and can effectively attain miniaturization and reduction of a number of components. Accordingly, the present disclosure is widely applicable to a lens barrel provided with a tripod mount.

What is claimed is:

1. A lens barrel detachably attached to a camera body, the lens barrel comprising:
a front frame to hold an optical system;
a rear frame that constitutes an outer peripheral surface of the lens barrel together with the front frame, the rear frame being mounted to the front frame so as to be rotatable around an optical axis;
a tripod mount provided on the rear frame to be fixed to a tripod;
a fixing member that fixes the rear frame to the camera body at a predetermined rotational position to rotate around the optical axis, when the front frame is attached to the camera body; and
a locking pin extending from the tripod mount and along a radial of the rear frame that is at the predetermined rotational position, the locking pin restricts a rotation range of the rear frame by abutting on abutting parts at both ends of an arc-shaped groove on an inner peripheral surface of the front frame.

2. The lens barrel according to claim 1, wherein
the rear frame has a switch member for operation, and
when the camera body is rotated in a state in which the tripod mount is fixed to the tripod, relative rotation of the switch member to the tripod is regulated.

3. The lens barrel according to claim 2, wherein
the rear frame has a flexible board to electrically connect the switch members and the front frame, and
the locking pin is located on a subject side along an optical axis direction to the flexible board.

4. The lens barrel according to claim 3, wherein
the fixing member regulates rotation of the rear frame by pressing force to the front frame.

5. The lens barrel according to claim 4, wherein
the fixing member has a screw part formed to advance and retreat, crossing the optical axis.

6. The lens barrel according to claim 2, wherein
the fixing member regulates rotation of the rear frame by pressing force to the front frame.

7. The lens barrel according to claim 6, wherein
the fixing member has a screw part formed to advance and retreat, crossing the optical axis.

8. The lens barrel according to claim 1, wherein
the fixing member regulates rotation of the rear frame by pressing force to the front frame.

9. The lens barrel according to claim 8, wherein
the fixing member has a screw part formed to advance and retreat, crossing the optical axis.

10. A camera comprising:
the lens barrel according to claim 1; and
a camera body to which the lens barrel is attached.

* * * * *